(12) United States Patent
Ahouanto et al.

(10) Patent No.: US 10,369,849 B2
(45) Date of Patent: Aug. 6, 2019

(54) ADAPTER FOR ROLLING ASSEMBLY AND ROLLING ASSEMBLY COMPRISING SAME

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Michel Ahouanto, Clermont-Ferrand (FR); Luc Bestgen, Clermont-Ferrand (FR); Arthur Topin, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 510 days.

(21) Appl. No.: 15/106,791

(22) PCT Filed: Dec. 17, 2014

(86) PCT No.: PCT/EP2014/078174
§ 371 (c)(1),
(2) Date: Jun. 20, 2016

(87) PCT Pub. No.: WO2015/091618
PCT Pub. Date: Jun. 25, 2015

(65) Prior Publication Data
US 2017/0001473 A1    Jan. 5, 2017

(30) Foreign Application Priority Data
Dec. 19, 2013  (FR) ...................................... 13 62969

(51) Int. Cl.
*B60C 15/02* (2006.01)
*B60B 21/12* (2006.01)
(Continued)

(52) U.S. Cl.
CPC .......... *B60C 15/0203* (2013.01); *B60C 15/02* (2013.01); *B60C 15/0206* (2013.01);
(Continued)

(58) Field of Classification Search
CPC ... B60C 5/15; B60C 15/0209; B60C 15/0206; B60C 15/02; B60C 15/0203
See application file for complete search history.

(56) References Cited

U.S. PATENT DOCUMENTS 3,237,674 A * 3/1966 Budd ...................... B60C 15/04
                                                          152/540
3,486,547 A * 12/1969 Powers .................... B60C 3/00
                                                          152/454
(Continued)

FOREIGN PATENT DOCUMENTS

| FR | 2 491 836 | 4/1982 |
| WO | WO 92/01577 | 2/1992 |
| WO | WO 00/78565 | 12/2000 |

*Primary Examiner* — S. Joseph Morano
*Assistant Examiner* — Scott A Browne
(74) *Attorney, Agent, or Firm* — Cozen O'Connor

(57) ABSTRACT

An adapter for a rolling assembly comprising a tire having two beads (B), a rim (J) with two rim seats (7), said adapter connecting one of the beads and the rim. The adapter has an axially inner end (10) comprising inner reinforcer element (16), and an axially outer end (15) comprising outer reinforcer element (15), respectively mounted on a rim seat (7). Body (11) connects said outer end (9) to said inner end (10). Main reinforcement connects said outer reinforcer (15), and said inner reinforcer (16), a substantially cylindrical adapter seat (18) receiving one of said beads (B), an adapter bearing face (21) substantially contained in a plane perpendicular to the rion otataxis. The reinforcer element (15) of the axially outer end (9) is entirely situated axially outside the bearing face (21), and in that the body (11) comprises, opposite the adapter seat (7), an annular seat reinforcer (19).

19 Claims, 2 Drawing Sheets

(51) Int. Cl.
  *B60C 5/16*    (2006.01)
  *B60B 9/00*    (2006.01)
  *B60B 21/10*   (2006.01)

(52) U.S. Cl.
  CPC ............ *B60C 15/0209* (2013.01); *B60B 9/00* (2013.01); *B60B 21/102* (2013.01); *B60B 21/104* (2013.01); *B60B 21/12* (2013.01); *B60B 2360/3412* (2013.01); *B60B 2360/36* (2013.01); *B60B 2360/368* (2013.01); *B60B 2360/50* (2013.01); *B60B 2900/111* (2013.01); *B60B 2900/131* (2013.01); *B60B 2900/212* (2013.01); *B60B 2900/321* (2013.01); *B60B 2900/351* (2013.01); *B60B 2900/721* (2013.01); *B60C 5/16* (2013.01)

(56) References Cited

U.S. PATENT DOCUMENTS

| | | | | |
|---|---|---|---|---|
| 4,373,567 | A * | 2/1983 | Declercq | B60B 21/10 |
| | | | | 152/379.3 |
| 6,626,217 | B2 * | 9/2003 | Bestgen | B60B 25/18 |
| | | | | 152/379.4 |
| 2009/0025848 | A1 * | 1/2009 | Ferlin | B60C 15/0027 |
| | | | | 152/539 |
| 2012/0031535 | A1 * | 2/2012 | Thompson | B60C 9/18 |
| | | | | 152/209.18 |
| 2012/0145302 | A1 * | 6/2012 | Feltes | B60C 15/0027 |
| | | | | 152/541 |

\* cited by examiner

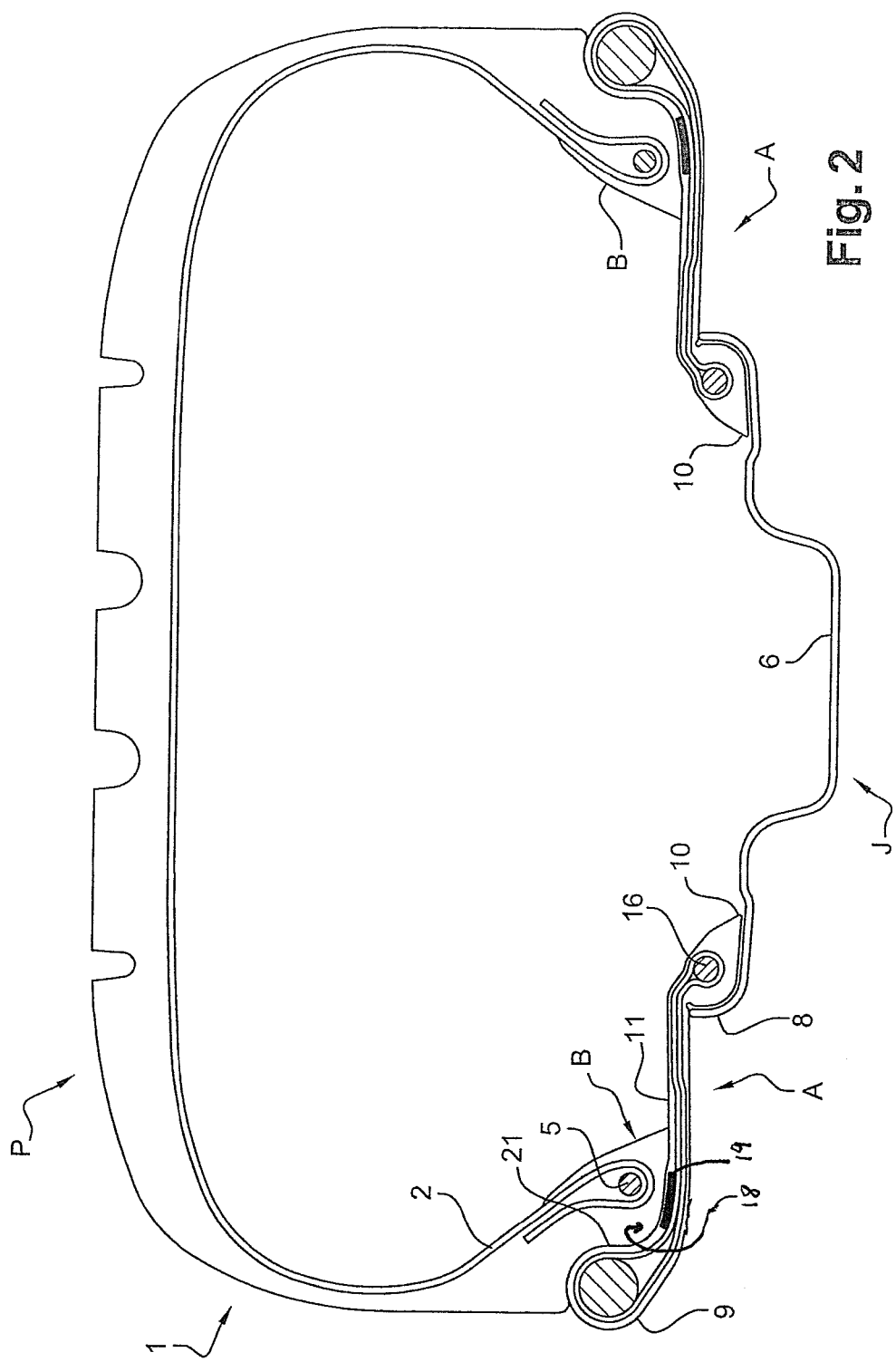

ADAPTER FOR ROLLING ASSEMBLY AND ROLLING ASSEMBLY COMPRISING SAME

RELATED APPLICATIONS

This is a U.S. National Phase Application under 35 USC 371 of International Application PCT/EP2014/078174 filed on Dec. 17, 2014.

This application claims the priority of French application no. 1362969 filed Dec. 19, 2013, the entire content of which is hereby incorporated by reference.

FIELD OF THE INVENTION

The invention relates to an adapter for a rolling assembly formed mainly of a tire and a rim, and to a rolling assembly comprising said adapter.

BACKGROUND OF THE INVENTION

A reminder of the definitions used in the present invention is given below:
 "axial direction" is a direction parallel to the rotation axis of the tire,
 "radial direction" is a direction that intersects the rotation axis of the tire and is perpendicular thereto,
 "circumferential direction" is a direction perpendicular to a radius and contained in a plane perpendicular to the rotation axis of the tire,
 "radial section" is a section in a plane which contains the rotation axis of the tire,
 "equatorial plane" is the plane perpendicular to the rotation axis and passing through the middle of the tread.

It is already known from the application WO00/78565 to insert an elastic adapter between the rim and the beads of a tire. This adapter is elastically deformable in the radial and axial directions. Such an adapter makes it possible to separate that part of the rolling assembly that can be considered to actually act as a tire from that part of the rolling assembly that can be considered to act as a rim.

However, although such an assembly also makes it possible to ensure the functions of a conventional tire, notably a drift thrust response of the tire following the application of a drift angle to the tire, thereby giving the assembly sufficient flexibility for it to avoid any surface deterioration or depth deterioration, it does not perfectly ensure sufficient deformability of the tire in the event of impacts with kerbs or holes in the roadway, such as potholes.

This is because the assembly mounted with the adapter of the prior art does not make it possible to obtain a local deformation in the region of the contact patch. The teaching of that document also has the drawback of not making it easily possible to obtain embodiments of the adapter that afford a high capability of absorbing large deformations on passing through potholes without residual plastic deformations.

That document gives no suggestions for architectural adaptations which would lead to an outer reinforcer deformation that is localized in the region of the contact patch resulting in a reduced camber and thus making the mounted assembly less intrusive with regard to the vehicle.

An adapter disposed between the rim and each bead of a tire and intended to make it easier to mount/remove the latter is also known from the document FR2,491,836. That adapter mainly comprises two annular bead wires that are spaced apart from one another and mounted inside an annular body comprising a ply. The bead wires are connected by a cord which, moreover, surrounds them. That adapter allows mounting on a greater rim diameter with the same axial spacing of the beads.

SUMMARY OF THE INVENTION

One object of the invention is to provide a novel adapter which ensures better protection of the tire in the event of impacts with the tire that are due to use on roads in poor condition, thereby minimizing as far as possible partial or even total damage to its internal structure, while keeping the road holding performance of the tire at a high level, in particular its ability to develop high drift thrusts. Another object of the invention is, in the event of damage due to unusually harsh use, to keep the vehicle safe through its movement over a short distance following an impact that destroys the assembly.

These and other objects are attained in accordance with one aspect of the invention directed to an adapter for a rolling assembly having a rotation axis and comprising:
 a tire having two beads, and
 a rim,
said adapter providing the connection between one of the beads and the rim, said rim having two rim seats, said adapter having:
 an axially inner end that is intended to be mounted on the rim seat and comprises an inner reinforcer element,
 an axially outer end that comprises an outer reinforcer element,
 a body that connects said outer end to said inner end so as to form a single piece and comprises at least one main reinforcement that provides the connection between said outer reinforcer and said inner reinforcer,
 a substantially cylindrical adapter seat intended to receive one of said beads, said seat being situated at the axially outer end of said body,
 an adapter bearing face substantially contained in a plane perpendicular to the rotation axis, said bearing face being situated on the axially inner face of the axially outer end.

The adapter is characterized in that the reinforcer element of the axially outer end is entirely situated axially outside the bearing face, and in that the body comprises, opposite the adapter seat, an annular seat reinforcer.

The adapter according to the invention has the advantage of having a simple design and being easy to mount. Moreover, owing to the increase in clamping under the beads of the tire, the adapter according to the invention makes it possible to prevent the rotation thereof on the adapter under high lateral stress.

Finally, the adapter according to the invention has the advantage of significantly reducing the level of mechanical forces towards the chassis in the event of an impact, and thus of making it possible to make the body shell of the vehicle lighter.

Another aspect of the invention is directed to a rolling assembly having a rotation axis and comprising:
 a tire having two beads,
 a rim,
 said adapter providing the connection between one of the beads and the rim,
 said rim having two rim seats,
 said adapter having:
 an axially inner end that is intended to be mounted on the rim seat and comprises an inner reinforcer element,
 an axially outer end that comprises an outer reinforcer element, a body that connects said outer end to said inner end so as to form a single piece and comprises at least one main reinforcement that provides the connection between said outer reinforcer and said inner reinforcer, a substantially cylindrical adapter seat intended to receive one of said beads, said seat being situated at the axially outer end of said body, an adapter bearing face substantially contained in a plane perpendicular to the rotation axis, said bearing face being situated on the axially inner face of the axially outer end This rolling assembly is characterized in that the reinforcer element of the axially outer end is entirely situated axially outside the bearing face, and in that the body comprises, opposite the adapter seat, an annular seat reinforcer.

The adapter allows a rolling assembly to have sufficient radial deformations between the bead of the tire and the rim, during its use and while it is inflated to a nominal pressure, to allow the desired protection with regard to lateral impacts.

The axially outer end of the adapter delimits, axially, a "housing intended to receive the bead of the tire". The bearing face of the axially outer end serves to support the bead of the tire in the axial direction, in the same way as a rim flange.

In this way, the housing receives the bead of the tire just as the seat of a rim conventionally does. The tire is then immobilized axially by the inflation pressure and is pressed against the bearing face of this axially outer end in the same way as is conventionally done for the bead of a tire against the rim flange of a rim.

The axially inner end of the adapter may be denoted "adapter bead" since it is intended to couple the adapter to the rim flange of a rim in the same way as is conventionally done by the bead of a tire.

Thus, with the rolling assembly according to the invention in operation and at the operating stresses for which it is designed, the tire is immobilized axially with respect to the rim, more specifically the beads of the tire are immobilized axially with respect to the rim in the same way as for a conventional rolling assembly in which the beads of the tire are mounted directly on the seats of a rim, and the beads of the tire are not immobilized radially with respect to the rim, more specifically the beads of the tire are capable of a degree of radial movement with respect to the rim. Under standard rolling conditions, it may be said that there is virtually no axial deformation of the adapter, or it is negligible with respect to the radial deformation.

On the other hand, during an impact, the axial deformation of the adapter can be great, thereby contributing to reducing the stresses on the mounted assembly.

Preferably, the reinforcer element of the axially outer end is disposed radially on the outside of the adapter seat.

Preferably, the annular seat reinforcer has a compression modulus greater than or equal to 1 GPa, and preferably greater than 4 GPa, and more preferably greater than 10 GPa. The annular reinforcer may be made up of a core surrounded by an elastomer, or of a succession of layers of elastomer compounds and metal and/or textile reinforcers disposed in any possible combination. The core may comprise at least one element chosen from a metal, a composite material, a thermoplastic, and a mixture thereof. The composite material may be made from glass fibres embedded in a resin matrix.

The list of elastomers that can be used includes, firstly, rubbers that are crosslinkable by chemical vulcanization reactions by sulphur bridges, by carbon-carbon bonds created by the action of peroxides or of ionizing radiation, by other specific atom chains of the elastomer molecule, secondly, thermoplastic elastomers (TPEs) in which the elastically deformable part forms a network between rather non-deformable "hard" regions, the cohesion of which is the product of physical connections (crystallites or amorphous regions above their glass transition temperature), and next non-thermoplastic elastomers and finally thermoset resins.

The annular seat reinforcer may be made up of at least two layers of different constituents disposed successively and in alternation. Disposition in alternation means successive disposition of a first layer and then a second layer, several times.

The annular seat reinforcer may have an overall axial length greater than or equal to 30% of the width of the bead of the tire, and less than 150% of this same width, and more preferably between 40 and 110% of the width of the bead of the tire.

The annular seat reinforcer may have a mean radial thickness greater than or equal to 0 3 mm and less than or equal to 20 mm depending on the size and the use of the tire. Thus, for a passenger car tire, the thickness is preferably between 0.5 and 10 mm.

The annular seat reinforcer preferably comprises at least one element chosen from a metal, a composite material, a thermoplastic, and a mixture thereof. This core or this multilayer is preferably contained between two layers of a matrix comprising the choice of an elastomer as cited above, a resin or a mixture thereof.

The annular seat reinforcer preferably consists of a stack of different layers of elastomer compounds with an identical or different chemical nature.

When it is in the form of a stack of layers, the reinforcer preferably has an axial length greater than 5 mm and less than 25 mm and a radial thickness greater than or equal to 0.1 mm and less than or equal to 4 mm.

Each single element of which the stack of the reinforcer is made may have an axial length greater than 1 mm and less than 25 mm and an identical or different radial thickness greater than or equal to 0.1 mm and less than or equal to 2 mm.

The annular seat reinforcer may also be in the form of a stack of single threads between a layer of a matrix comprising the choice of an elastomer, a thermoplastic compound, a resin, or a mixture thereof. The single threads may be threads that are conventionally used, such as textile threads (polyester, nylon, PET, aramid, rayon, natural fibres (cotton, flax, hemp)), metal threads, composite threads (carbon, glass-reinforced plastic), or mixtures of these constituents.

The annular seat reinforcer may also be in the form of one or more plies, the reinforcers of which are disposed at an angle of between 0 and 90° with respect to the circumferential direction of the tire.

Preferably, the annular reinforcer may be disposed radially outside or radially inside the body of the adapter, on either side of said body, or else between the plies of reinforcing elements of the body of the adapter.

The outer reinforcer element may consist of metal (steel), nylon, PET or aramid. It may comprise a matrix of resin and/or reinforcing fibres, such as rayon, aramid, PET, nylon, glass fibre, carbon fibre, basalt fibre, poly(ethylene 2,6-naphthalate) (PEN), or polyvinyl alcohol (PVA).

The main reinforcement of said body may have a modulus greater than or equal to 4 GPa; it may consist of metal (steel), of textile cord (rayon, aramid, PET, nylon, glass fibre, carbon fibre, basalt fibre, poly(ethylene 2,6-naphthalate) (PEN), or polyvinyl alcohol (PVA).

Preferably, the adapter may be disposed on one side of the rim, and preferably on the outer side of the vehicle. In this case, the rim has an asymmetrical geometric shape so as to adapt to the presence of the adapter present on one side.

The axial length L of the body of the adapter according to an embodiment of the invention may be greater than 2.54 cm and less than 8 cm, and preferably greater than 3.17 cm and less than 5.10 cm.

When the mounted assembly comprises two adapters, the latter may be symmetrical or non-symmetrical. The concept of symmetry or asymmetry of the adapter is defined by the axial length of the body of the adapter. Two adapters are asymmetrical when the body of one of them has an axial length greater than that of the other.

Preferably, the rolling assembly according to an embodiment of the invention comprises a first and a second adapter that each have a body with a different or identical length.

BRIEF DESCRIPTION OF THE DRAWINGS

The invention will now be described with the aid of examples and figures which follow and which are given purely by way of illustration, and in which:

FIG. 2 schematically shows, in radial section, a tire mounted on two adapters according to the invention, which are themselves fitted on the rim in a removable manner.

DETAILED DESCRIPTION OF THE DRAWINGS

Figure 1:
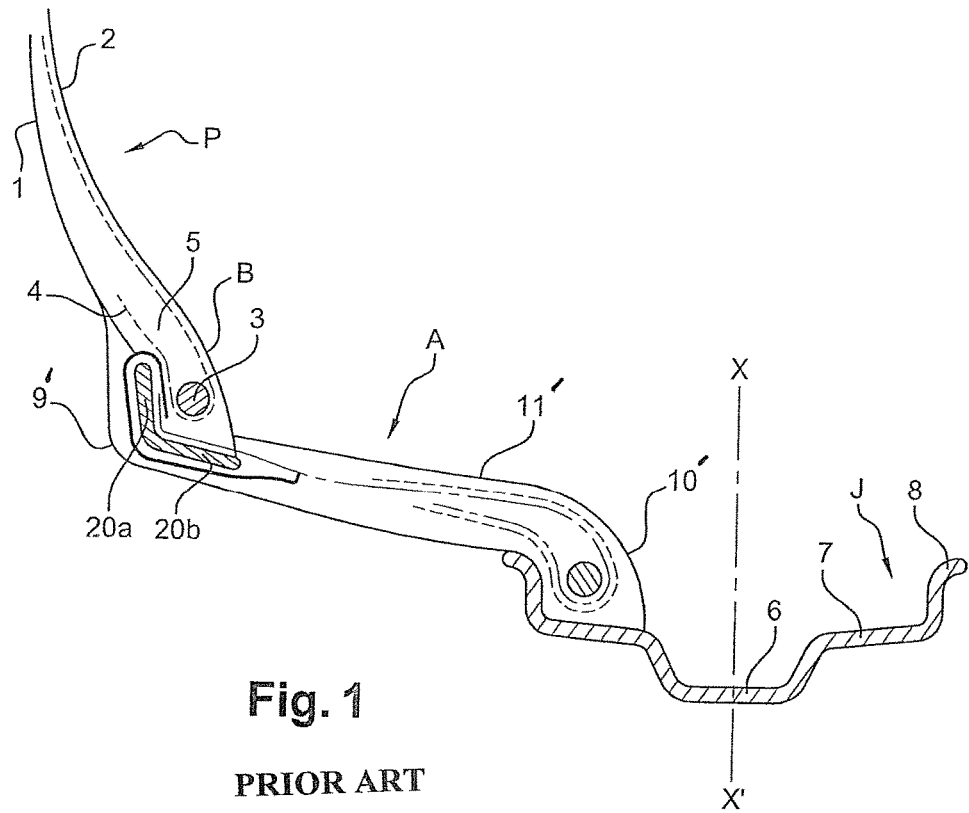
FIG. 1 schematically shows the adapter according to the prior art.

FIG. 1, which shows an adapter according to the prior art, comprises a tire P (partially shown), an adapter A and a rim J.

The tire, which is of unaltered design per se in the invention, consists of a tread reinforced by a crown reinforcement joined to two beads B on either side of an equatorial plane XX' by way of two sidewalls 1. A carcass reinforcement 2 that mainly reinforces the sidewalls 1 is anchored in each bead B at at least one bead wire, in this case of the "braided" type 3, so as to form turn-ups 4 that are separated from the main part of the carcass reinforcement by profiled elements 5 having a quasi triangular shape.

It is important to note that the invention can be implemented with a large number of types of tire, be they radial tires or diagonal tires, or even with tires of the type having self-supporting sidewalls.

The rim J comprises a groove 6, known as a mounting groove, that connects, on either side of the equatorial plane, two rim seats 7 that are axially extended by rim flanges 8, the radially outer edges of which are curved.

The adapter A mainly comprises an axially outer end 9', an axially inner end 10' and a body 11' connecting said end 9' to said end 10'.

The axially outer end 9' comprises an outer reinforcer element made up of a first portion 20a that is connected to a second portion 20b that form a substantially perpendicular angle between one another. During the mounting of the tire, the bead seat of the bead B is fitted into the space created by this outer reinforcer element.

FIG. 2 shows a mounted assembly comprising two adapters A according to the invention that connect the beads B of the tire P to two rim flanges 8 of the rim J. The adapters of this FIG. 2 are removable from the rim J and the beads B of the tire.

The adapter A, which is disposed at each bead B of the tire, may be symmetrical or non-symmetrical. Symmetry means that the overall length of the body 11 is identical on both adapters. When the assembly (tire, rim and adapter) is mounted, the beads B of the tire are disposed on the adapter seat 18 and made to bear axially against a bearing face 21.

Figure 3:
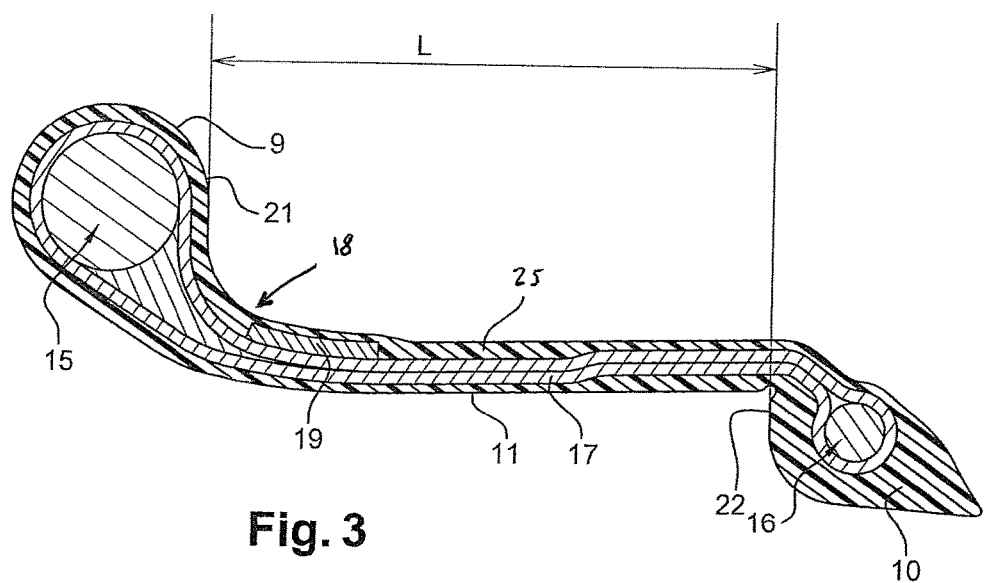
FIG. 3 shows a schematic view, in radial section, of a non-mounted adapter according to the invention.

FIG. 3 shows an adapter according to the invention which is not mounted on a rim. This adapter comprises, on one side, an axially outer end 9 with an outer reinforcer 15 having a substantially spherical geometric shape in section, consisting of a composite material such as glass-reinforced plastic, and, on the other side, an axially inner end 10 with a metal reinforcer 16, and finally a body 11 made up of two plies 17 that comprise textile cords. The cords of each ply are mutually parallel. On one side, said plies 17 are joined axially on the inside and radially on the outside to the walls of the reinforcer 15, and on the other side, they are anchored, in the end 10, to the metal reinforcer 16, such as a bead wire that forms a turn-up at each end.

The body 11 comprises a substantially cylindrical adapter seat 18 that is intended to receive a bead of the tire that is disposed at the axially outer end of the body 11.

The body 11 also comprises an adapter bearing face 21 that is contained substantially in a plane perpendicular to the rotation axis, is situated on the axially inner face of the axially outer end, and is intended to keep the bead in place in its housing. This adapter seat 18 comprises an annular seat reinforcer 19 that has a compression modulus equal to 100 GPa. According to the depiction in this FIG. 3, the entirety of the reinforcer 19 is disposed at the radially outer surface of the surface of the body 11.

The body 11 has a length of about 3.175 cm (1.25 inches). This length is measured between the bearing face 21 and the axially outer lip 22 of the axially inner end 10.

In contrast to the known device (FIG. 1), the annular seat reinforcer 19 is not secured to the outer reinforcer 15. These two reinforcers 19, 15 are entirely independent of one another.

The reinforcer 19 is made up of a tri-layer comprising metal reinforcers in the form of wires, alternating with an elastomer of the rubber-resin type. The reinforcer 19 has a radial thickness of about 1.5 mm and an axial length of about 15 mm.

The elastomer layer of the reinforcer 19 has a radial thickness of about 0.3 mm and an axial length of about 15 mm.

A layer of elastomer 25 covers all of the elements that make up the adapter, namely the reinforcer 15, the reinforcer 16, the body 11 and the radially outer surface of the reinforcer 19.

The following examples show the results obtained with the adapter according to the invention.

EXAMPLE

Kerb Impact Tests

This test consists in causing a mounted assembly to mount a kerb at an angle of attack of 30°. The choice of this angle is based on the fact that it constitutes very harmful stress for a tire. The test is carried out with two different kerb heights (90 mm and 110 mm).

The test proceeds as follows. Several passes of the wheel at different speeds are carried out until the tire is punctured. The starting speed is 20 km/h and then the speed is incremented by 5 km/h on each new pass.

A conventional assembly without an adapter (control 1) is compared with an assembly provided with an adapter according to the document WO00/78565 (control 2) and with an assembly provided with an adapter according to the invention (invention). These assemblies are all of the size 205/55R16 comprising a 6.5J16 rim. The results are collated in the following Table I and are given in percent:

TABLE I

|  | Control 1 | Control 2 | Invention |
|---|---|---|---|
| Percentage of the puncturing speed compared with control - kerb height 90 mm | 100 | >150 | >150 |
| Level of force of raised vertical bearing-surface (Fz) at the puncturing speed | 100 | 50 | 40 |
| State of the mounted assembly following the impacts | Tire punctured Wheel marked | Tire and wheel intact Adapter plastically deformed | Tire, adapter and wheel intact |

Results greater than 100 show an improvement in behaviour when subjected to a lateral impact.

The test carried out at the kerb height of 90 mm led to the puncturing of the control tire at a speed of 30 km/h, whereas the assembly according to the invention did not suffer any damage at the same speed, or even at a speed of 50 km/h.

The test carried out at the kerb height of 110 mm led to the puncturing of the control tire at a speed of 20 km/h, whereas the assembly according to the invention did not suffer any damage at the same speed, or even at a speed of 50 km/h.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. An adapter for a rolling assembly having a rotation axis and comprising:
   a tire having two beads;
   a rim;
   said adapter connecting one of the beads to the rim;
   said rim having two rim seats;
   said adapter comprising:
      an axially inner end that is adapted to be mounted on one of the rim seats and comprises an inner reinforcer element;
      an axially outer end that comprises an outer reinforcer element;
      a body that connects said outer end to said inner end so as to form a single piece and comprises at least one main reinforcement that provides a connection between said outer reinforcer and said inner reinforcer;
      a substantially cylindrical adapter seat adapted to receive one of said beads, said adapter seat being situated at the axially outer end of said body; and
      an adapter bearing face substantially contained in a plane perpendicular to the rotation axis, said bearing face being situated on the axially inner face of the axially outer end,
      wherein the reinforcer element of the axially outer end is entirely situated axially outside the bearing face, and
      wherein the adapter seat has an annular seat reinforcer arranged at a radially outer region of the adapter seat, the annular seat reinforcer being arranged entirely axially inward of the outer reinforcer.

2. The adapter according to claim 1, wherein the reinforcer element of the axially outer end is disposed radially on the outside of the adapter seat.

3. The adapter according to claim 1, wherein the annular seat reinforcer has a compression modulus greater than or equal to 1 GPa.

4. The adapter according to claim 1, wherein the annular seat reinforcer is comprised of a core surrounded by an elastomer.

5. The adapter according to claim 4, wherein the core comprises at least one element chosen from a metal, a composite material, a thermoplastic, and a mixture thereof.

6. The adapter according to claim 1, wherein the annular seat reinforcer is comprised of at least two layers of different constituents disposed in alternation.

7. The adapter according to claim 5, wherein the core comprises the composite material and the composite material is comprised of glass fibres embedded in a resin material.

8. The adapter according to claim 1, wherein the annular seat reinforcer has an overall axial length greater than or equal to 30% of the width of one of the beads of the tire, and less than 150% of said width.

9. The adapter according to claim 8, wherein the overall axial length of the annular seat reinforcer is between 40 and 110% of the width of the one of the beads of the tire.

10. The adapter according to claim 1, wherein the annular seat reinforcer has a mean radial thickness greater than or equal to 0.3 mm and less than or equal to 20 mm.

11. The adapter according to claim 1, wherein the body has an axial length greater than 2.54 cm and less than 8 cm.

12. The adapter according to claim 11, wherein the axial length of the body is greater than 3.17 cm and less than 5.10 cm.

13. The adapter according to claim 1, wherein the annular seat reinforcer has a compression modulus greater than 4 MPa.

14. A rolling assembly having a rotation axis and comprising:
   a tire having two beads;
   a rim;
   an adapter connecting one of the beads to the rim;
   said rim having two rim seats,
   said adapter comprising:
      an axially inner end that is adapted to be mounted on one of the rim seats and comprises an inner reinforcer element;
      an axially outer end that comprises an outer reinforcer element;
      a body that connects said outer end to said inner end so as to form a single piece and comprises at least one main reinforcement that provides a connection between said outer reinforcer and said inner reinforcer;
      a substantially cylindrical adapter seat adapted to receive one of said beads, said adapter seat being situated at the axially outer end of said body; and
      an adapter bearing face substantially contained in a plane perpendicular to the rotation axis, said bearing face being situated on the axially inner face of the axially outer end, wherein the reinforcer element of the axially outer end is entirely situated axially outside the bearing face, and wherein the adapter seat has an annular seat reinforcer arranged at a radially outer region of the adapter seat, the annular seat reinforcer being arranged entirely axially inward of the outer reinforcer.

15. The rolling assembly according to claim 14, further comprising a second adapter, wherein each adapter has a respective body with a different length.

16. The rolling assembly according to claim 14, further comprising a second adapter, wherein each adapter has a respective body with an identical length.

17. The rolling assembly according to claim 14, wherein the body has an axial length greater than 2.54 cm and less than 8 cm.

18. The rolling assembly according to claim 17, wherein the axial length of the body is greater than 3.17 cm and less than 5.10 cm.

19. The rolling assembly according to claim 18, wherein the reinforcer element of the axially outer end is disposed radially on the outside of the adapter seat.

* * * * *